United States Patent
Ivan

(10) Patent No.: US 7,959,012 B2
(45) Date of Patent: Jun. 14, 2011

(54) OIL-BASED SLUDGE SEPARATION AND TREATMENT SYSTEM

(75) Inventor: Catalin Ivan, Houston, TX (US)

(73) Assignee: M-I L.L.C., Houston, TX (US)

( * ) Notice: Subject to any disclaimer, the term of this patent is extended or adjusted under 35 U.S.C. 154(b) by 946 days.

(21) Appl. No.: 11/437,359

(22) Filed: May 19, 2006

(65) Prior Publication Data
US 2006/0273051 A1    Dec. 7, 2006

Related U.S. Application Data

(60) Provisional application No. 60/682,472, filed on May 19, 2005.

(51) Int. Cl.
*B01D 21/26* (2006.01)

(52) U.S. Cl. .................. 210/512.1; 210/198.1; 210/202; 210/206; 210/256; 210/258; 210/513; 210/532.1; 210/533; 210/537; 210/536; 210/788

(58) Field of Classification Search ............... 210/512.1, 210/512.2, 513, 788, 806, 170, 202, 206, 210/216, 252, 256, 258, 259, 297, 298, 299, 210/198.1, 532.1, 533, 537, 536, 78, 8
See application file for complete search history.

(56) References Cited

U.S. PATENT DOCUMENTS

| | | | | | |
|---|---|---|---|---|---|
| 1,996,547 | A | * | 4/1935 | Mason | 209/465 |
| 2,387,437 | A | * | 10/1945 | Goggin | 126/101 |
| 2,919,898 | A | * | 1/1960 | Marwil et al. | 175/66 |
| 2,941,783 | A | * | 6/1960 | Stinson | 175/206 |
| 3,415,375 | A | * | 12/1968 | Wikdahl | 210/512.1 |
| 3,723,309 | A | * | 3/1973 | Garcia | 210/704 |
| 3,783,129 | A | * | 1/1974 | Bunn | 210/671 |
| 4,377,475 | A | * | 3/1983 | Wiedemann | 210/136 |
| 4,417,976 | A | * | 11/1983 | Sander et al. | 208/188 |
| 4,617,031 | A | * | 10/1986 | Suh et al. | 95/243 |
| 4,636,308 | A | * | 1/1987 | Summers | 210/195.1 |

(Continued)

FOREIGN PATENT DOCUMENTS
EP    0224353 B1    1/1993

(Continued)

OTHER PUBLICATIONS

International Search Report issued on Oct. 13, 2006 for PCT/US2006/019373, filed on May 19, 2006.

*Primary Examiner* — Tony G Soohoo
*Assistant Examiner* — David C Mellon

(57) ABSTRACT

An apparatus for treating oil-based sludge includes a boiler, a heat exchanger having a circulatory steam path in fluid communication with the boiler and a sludge path receiving sludge, a plurality of serially-aligned mixers in fluid communication with the sludge path of the heat exchanger, a separation tank in fluid communication with the plurality of mixers, and wherein the separation tank includes a tank having a plurality of walls, a hydrocyclone mounted within the tank receiving sludge from the plurality of mixers, wherein the hydrocyclone includes a solids outlet directing a solids component towards a bottom portion of the tank and a fluid outlet directing a fluid component into the tank, a means for conveying separated solids along the bottom portion of the tank to a solids outlet, and a plurality of fluid outlets vertically located along a tank wall, wherein each outlet includes a valve providing selective fluid communication from the tank.

20 Claims, 5 Drawing Sheets

U.S. PATENT DOCUMENTS

| | | | | |
|---|---|---|---|---|
| 4,931,176 A | * | 6/1990 | Guinard | 210/179 |
| 5,271,851 A | | 12/1993 | Nelson et al. | |
| 5,300,222 A | * | 4/1994 | Broussard, Sr. | 210/202 |
| 5,900,137 A | * | 5/1999 | Homan | 210/85 |
| 6,069,002 A | | 5/2000 | Powell, Jr. | |
| 6,132,596 A | * | 10/2000 | Yu | 208/179 |
| 6,258,332 B1 | | 7/2001 | Johnson et al. | |
| 6,790,349 B1 | * | 9/2004 | Sawyer | 210/173 |
| 2001/0032812 A1 | * | 10/2001 | Morse et al. | 210/257.1 |
| 2003/0034308 A1 | | 2/2003 | Uefuji et al. | |

FOREIGN PATENT DOCUMENTS

| | | |
|---|---|---|
| JP | 8-281298 A | 10/1996 |
| KR | 10-0249762 B1 | 3/2000 |

\* cited by examiner

OIL-BASED SLUDGE SEPARATION AND TREATMENT SYSTEM

This application claim priority to U.S. Provisional Patent Application Ser. No. 60/682,472 filed on May 19, 2005 entitled, "Oil-Based Sludge Separation and Treatment System" incorporated herein by reference for all purposes.

BACKGROUND OF INVENTION

The term "sludge" is a generic description of an oily waste stream that typically has a high solids content and varying quantities of hydrocarbons and water. Certain sludges, such as those generated in the production of various hydrocarbon products, includes vessel sludges, tank bottom sediments and emulsions from water treatment systems. Waste sludge resulting from producing oil and gas wells, for example, is often stored in open pits where it may be left for considerable time before being treated. During such aging periods, the sludge undergoes chemical changes including the effects of weathering and volatilization. It is desirable to treat the sludge to reduce the risk of contamination of the surrounding area and to recover the valuable hydrocarbon component in the sludge.

Traditionally, disk stack centrifuges have been used to condition slope oil or sludge, but they are only effective for non-emulsified water and oil blends. However, due to the existence of the in-situ natural emulsifiers, production sludges are characterized by strong water-in-oil emulsions. For such blends, a disk stack centrifuge is ineffective. It would be an improvement in the art to have a method and apparatus that thermally and chemically treats the sludge.

SUMMARY

In one aspect, the invention is generally directed to an apparatus for treating oil-based sludge includes a boiler, a heat exchanger having a circulatory steam path in fluid communication with the boiler and a sludge path receiving sludge, a plurality of serially-aligned mixers in fluid communication with the sludge path of the heat exchanger, a separation tank in fluid communication with the plurality of mixers, and wherein the separation tank includes a tank having a plurality of walls, a hydrocyclone mounted within the tank receiving sludge from the plurality of mixers, wherein the hydrocyclone includes a solids outlet directing a solids component towards a bottom portion of the tank and a fluid outlet directing a fluid component into the tank, a means for conveying separated solids along the bottom portion of the tank to a solids outlet, and a plurality of fluid outlets vertically located along a tank wall, wherein each outlet includes a valve providing selective fluid communication from the tank.

In another aspect the invention is directed to an apparatus for treating oil-based sludge including a boiler producing steam, a heat exchanger having a circulatory steam path in fluid communication with the boiler and a sludge path receiving sludge, a plurality of mixers in fluid communication with the sludge path of the heat exchanger, wherein the mixers are aligned in series, a separation tank in fluid communication with the mixers, including a plurality of walls defining a tank, a selectively closable hood mounted to an upper edge of at least one wall of the tank, a hydrocyclone retained within a portion of the tank, wherein the hydrocyclone receives treated sludge from the mixers and removes a solid component from a fluid component in the sludge, directing the solids to a bottom portion of the tank and directing fluid to another portion of the tank, a plurality of fluid outlets each including a valve selectively communicating fluid from the tank, a solids outlet including a valve selectively communicating solids from the tank, and a means for conveying solids located along a bottom portion of the tank to the solids outlet.

In another aspect, the invention is directed to a method for treating oil-based sludge including warming sludge in a heat exchanger, injecting a demulsifying chemical into the sludge, shearing the sludge and the demulsifying chemical, separating a solid component from the sludge fluid in a hydrocyclone, discharging the separated solid component to a tank floor of a tank, conveying the separated solid component along the tank floor to a solids outlet, and feeding the sludge fluid to the tank, discharging the fluid from the tank to a fluids collection area.

Other aspects and advantages of the claimed subject matter will be apparent from the following description and the appended claims.

DETAILED DESCRIPTION

Figure 2:
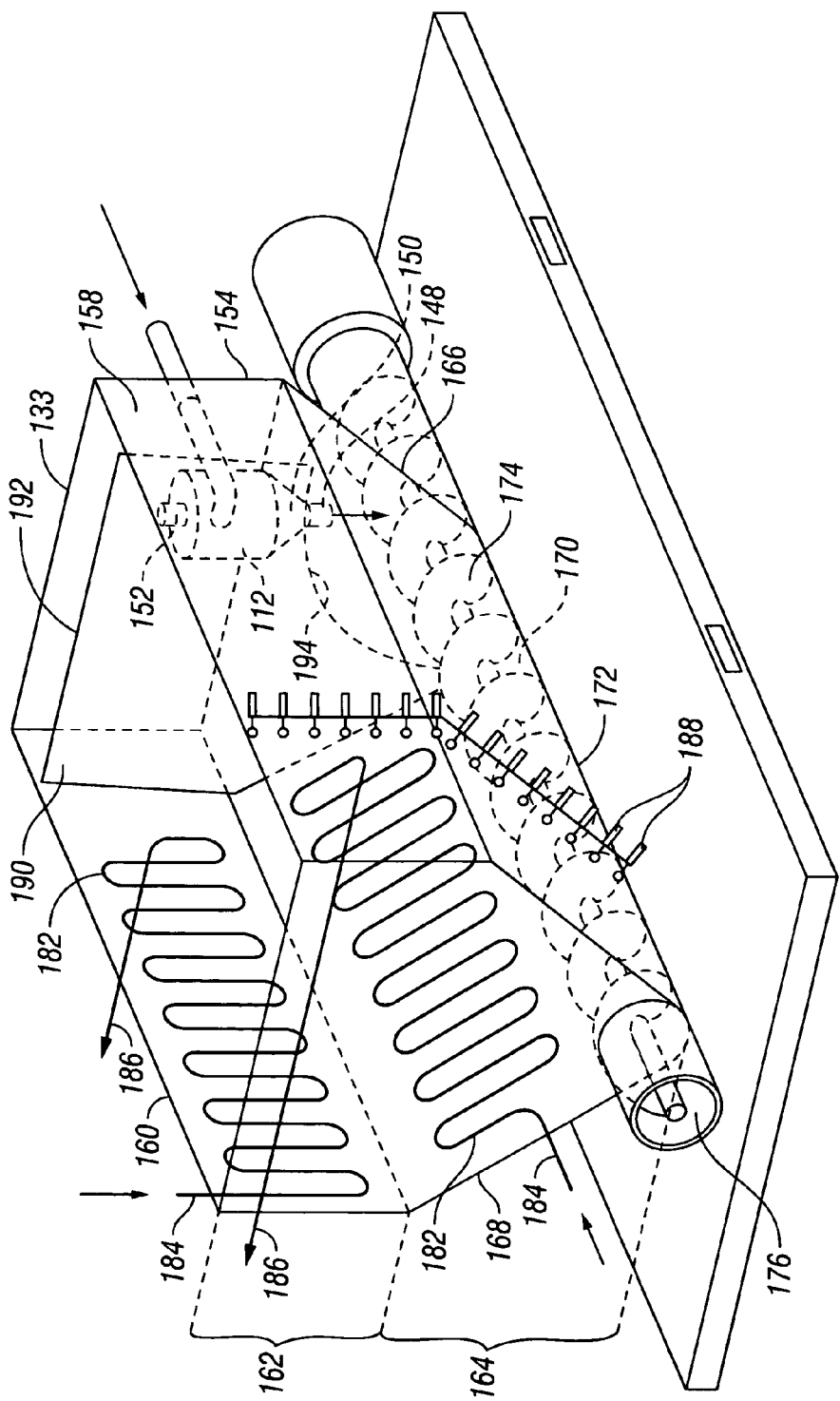
FIG. 2 is a perspective view of a separation and settling section of the modular sludge treatment apparatus.
Figure 3:
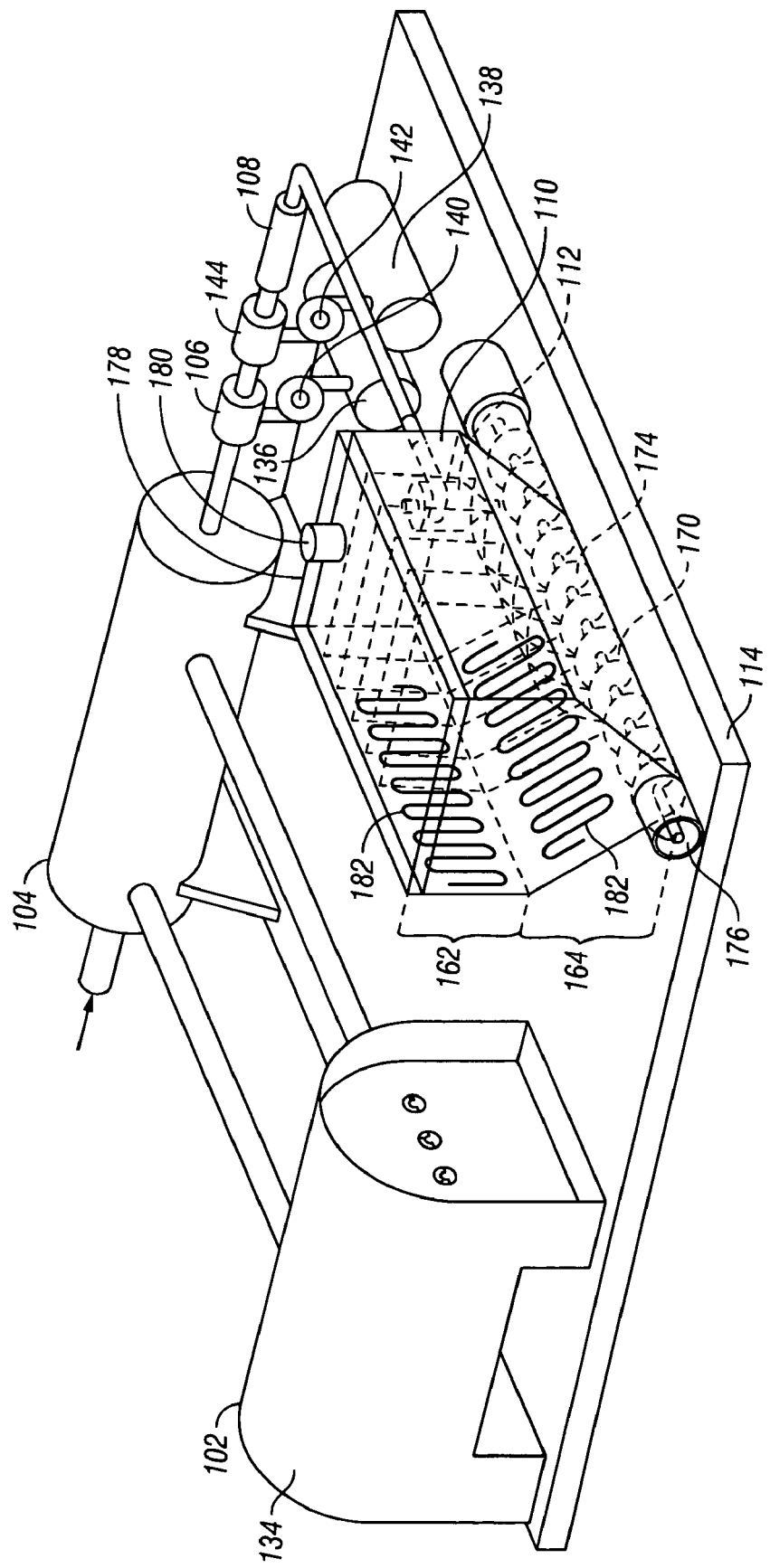
FIG. 3 is a perspective view of the modular sludge treatment apparatus.

The claimed subject matter relates to a modular apparatus 100, shown in FIG. 3, for treating oil-based sludge and a method for using the apparatus. The apparatus includes three primary sections, a heating section, a mixing section, and a separation and settling section. The heating section, shown in FIGS. 1, 3, and 5, includes a boiler 102 and a heat exchanger 104. The mixing section, shown in FIG. 3 and schematically in FIG. 6, includes mixers 106, 108. The separation and settling section, shown in FIGS. 2 and 3, includes a tank 110 within which a hydrocyclone 112 is located. As depicted in FIG. 3, in one embodiment, all three sections are co-located on a skid 114, making the entire apparatus 100 easily transportable.

Figure 1:
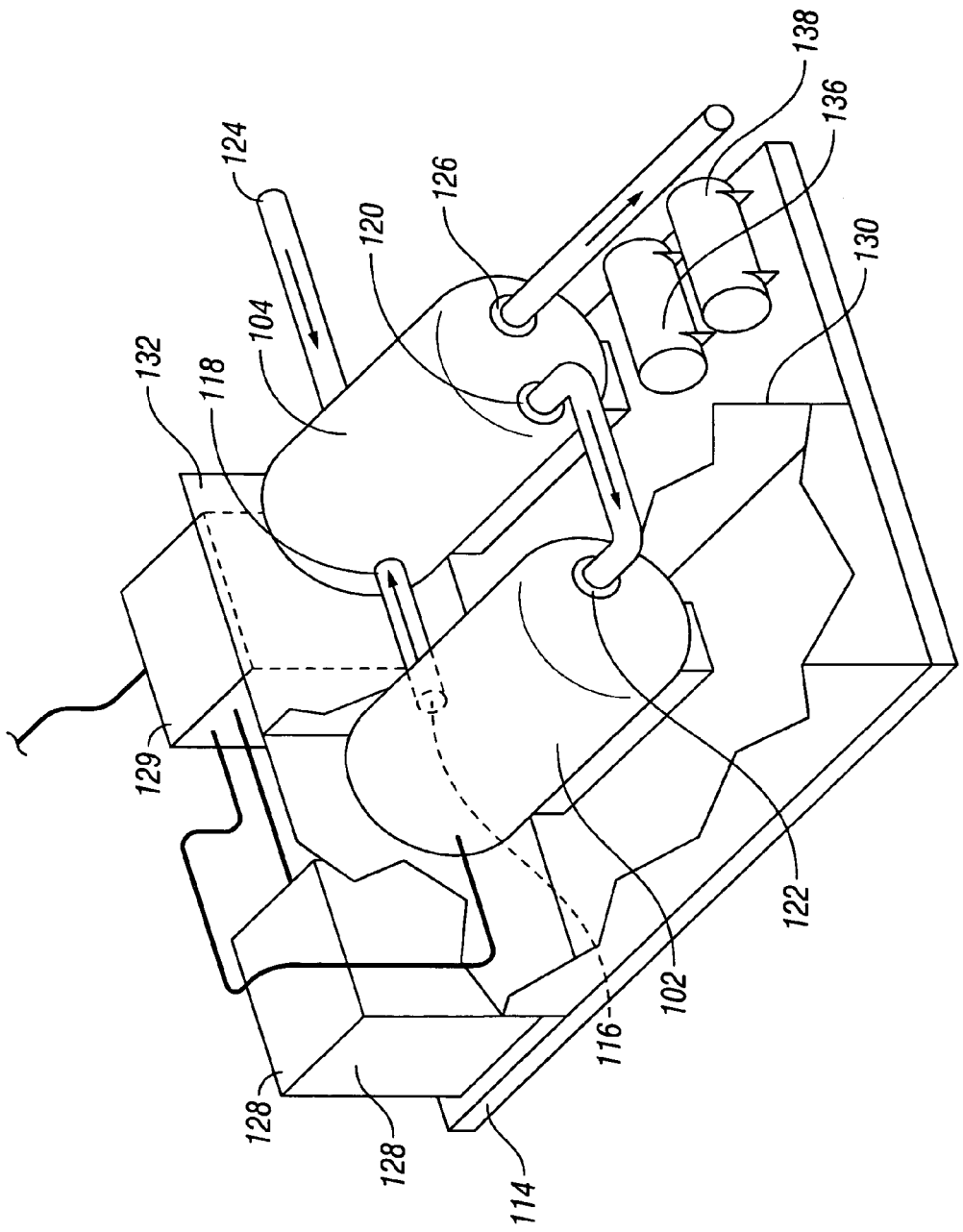
FIG. 1 is a perspective view of a heating section of a modular sludge treatment apparatus.
Figure 5:
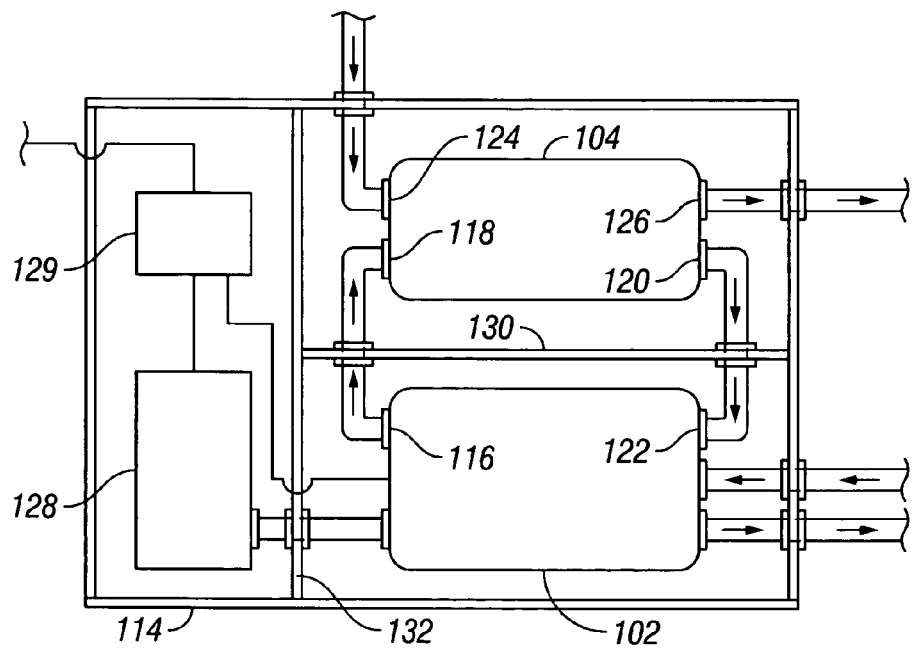
FIG. 5 is a top view of the heating section of the modular sludge treatment apparatus.

Referring to FIGS. 1 and 5, the heating section includes the boiler 102 and the heat exchanger 104. The boiler 102 is used to provide steam to the heat exchanger 104. Steam, heated in the boiler 102 is directed from a first steam outlet 116 to a first steam inlet 118 of the heat exchanger 104. After flowing through the heat exchanger 104, the cooled steam exits through a second steam outlet 120 and returns to the boiler 102 through a second steam inlet 122 to be reheated.

Sludge from a sludge holding area or tank (not shown) is directed into the heat exchanger 104 through a first sludge inlet 124. The sludge flows through the heat exchanger 104 in a path separate from that of the steam, but adjacent to it such that heat from the steam is transferred to the sludge. The pressure and temperature of the steam entering the heat exchanger 104 are preferably controlled so that the thermal properties of the sludge being warmed in the heat exchanger are within predetermined parameters. The sludge is warmed to a temperature sufficient to dissolve waxy hydrocarbons and lower the viscosity of the sludge so that it can flow through the apparatus 100. The temperature at which the sludge becomes liquid, and the corresponding rheological profile, can be determined using a viscometer, such as an oilfield Fann 35 viscometer available from Fann Instrument Co. As sludge will often be heated to melt wax components and aid phase separation, the flash point of the sludge is important.

As the temperature increases, vapor pressure increases and therefore the concentration of evaporated flammable liquid in the air increases. The flash point is that minimum temperature at which there is enough evaporated fuel in the air to start combustion. The flash point of the sludge can be determined. An example of a device for measuring the flash point of a liquid is the Pensky Martens Closed Cup according to method ASTM D93B.

The sludge, warmed by the steam in the heat exchanger 104, exits through a first sludge outlet 126. The heat exchanger 104 should fit within the confines of the area in the skid 114 to maintain portability of the entire sludge treatment apparatus 100. In one embodiment, the type of heat exchanger 104 used is a spiral type heat exchanger. It is understood that other types of heat exchangers can be used without departing from the scope of this invention. Some oil-based sludges include waxy hydrocarbons, which are preferably dissolved into liquid form in the heat exchanger 104 to lower the viscosity of the sludge. Treatment chemicals may be more easily blended with the sludge when the viscosity of the sludge is lower. Further, when the viscosity is lower, entrained solids are more easily released in downstream processing.

A fuel tank 128 may be co-located on the skid 114 to provide fuel to the boiler 102 for heating the dry steam. A control panel 129 may also be co-located on the skid 114 to monitor and control the treatment process.

In one embodiment, a first heat panel 130 is mounted to the skid 114 between the boiler 102 and the heat exchanger 104. The heat panel 130 isolates the boiler 102 from the heat exchanger 104. By insulating the boiler 102 from the heat exchanger 104, the predetermined parameters of the sludge may be better maintained than if the heat from the boiler unit 102 adds heat to the heat exchanger 104 outer surface.

In one embodiment, a second heat panel 132 is mounted to the skid 114 between the fuel tank 128 and the boiler 102 and heat exchanger 104. The second heat panel 132 insulates the fuel tank 128 from both the boiler 102 and heat exchanger 104.

In one embodiment, the boiler 102 is located within an insulating chamber 134, as shown in FIG. 3.

Figure 6:
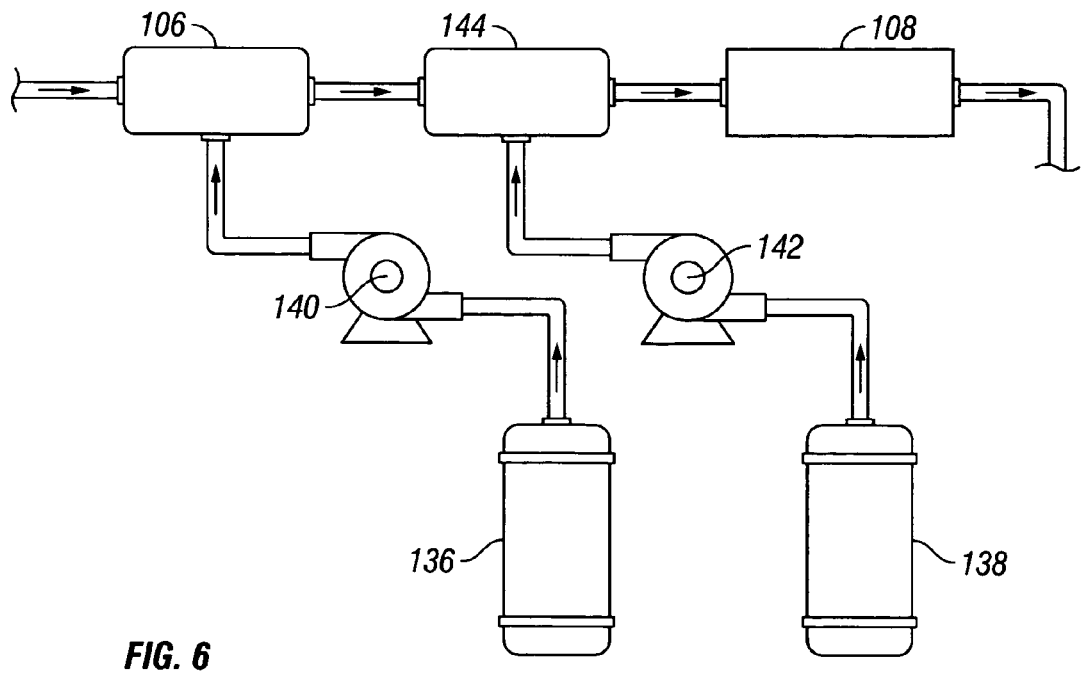
FIG. 6 is a schematic of the mixing section of the modular sludge treatment apparatus.

In certain sludge, where there is no emulsion or only a weak emulsion present, heat and gravity is sufficient to promote separation. Referring to FIGS. 3 and 6, for other sludge types, chemical addition may be required to weaken the emulsion and change such properties as wettability to decrease the separation time required. Such chemicals may include flocculant to induce the formation of flocs to which solids may coagulate and form larger solids. Demulsifiers may also be used to break any emulsion between water and oil in the sludge. Each chemical may be added to the sludge as the sludge is directed through the mixing section of the modular apparatus 100. The mixing section includes a plurality of mixers 106, 108. The chemicals are stored in tanks 136, 138 until they are injected into the sludge. One or more dosing pumps 140, 142 may be used to direct predetermined quantities of chemicals into the sludge. In one embodiment the predetermined amount of demulsifier is 2-3% by volume of sludge. The quantity of wax in the sludge can cause issues for pumping and phase separation in terms of the high viscosity it imparts and coating of entrained solids. Pour point suppressants can be added to sludge to prevent insoluble wax molecules in the oil phase from building a lattice at colder temperatures and results in the sludge maintaining its fluidity even at lower temperatures. In one embodiment, each treatment chemical is introduced to the sludge within a corresponding inline mixer 106, 144. In this embodiment, mixer 108 is a static shear mixer used to further blend the chemicals and the sludge. When it is desired to add more chemicals, each may be added through a corresponding mixer before the mixture is introduced to the static shear mixer 108. The static shear mixer 108 enhances blending of the treatment claims and sludge by inducing shear such that the flow is turbulent.

The sludge mixture is directed to the separation and settling section depicted in FIGS. 2 and 3. The separation and settling section includes a tank 110 and a hydrocyclone separator 112. The hydrocyclone separator 112 is preferably housed within the tank 110, near one end 133. The sludge and chemical mixture is fed directly to the hydrocyclone separator 112, which separates heavier solids from the mixture. The separated solids are released through a solids outlet 148 in the bottom portion 150 of the hydrocyclone separator 112. The liquid portion of the sludge mixture is fed through a fluid outlet 152 of the hydrocyclone separator 112 into the tank 110.

The tank 110 includes a plurality of walls, preferably two opposing end walls 154, 156 and two opposing side walls 158, 160, interconnected to form the tank 110. A bottom portion 164 of the tank 110, together with a top portion 162 form a basin for receiving material therein. The bottom portion 164 preferably includes a pair of opposed inclined walls 166, 168, which direct the sludge to a solids accumulation area 170 along a tank floor 172. Solids from the hydrocyclone separator 112 are directed to the tank floor 172 beneath the solids outlet 148. Finer solids remaining in the liquid portion of the separated sludge after exiting the hydrocyclone separator 112 can settle out of the fluid to the tank floor 172 while the sludge is in the tank 110.

A means for conveying settled solids 174 is located along the solids accumulation area 170 of the tank floor 172. The means for conveying settled solids 174 transfers solids in the accumulation area 170 to a solids outlet 176. In one embodiment, an auger is used for conveying solids. It will be appreciated by those of skill in the art that other means for conveying settled solids 174 may also be used.

A hood 178, shown in FIG. 3, may be mounted to the tank 110 to enclose the basin formed by the top portion 162 and the bottom portion 164. The hood 178 is preferably mounted in such a way that it may be selectively opened to provide access to the tank 110. An air outlet 180 may be provided through the hood 178 for the evacuation of gases that may collect in the tank 110. A vacuum pump (not shown) may be used to evacuate air from the tank and a charcoal filter (not shown) may be provided within the air conduit (not shown) to deodorize air before it is released to the atmosphere. Further filters may be used to clean air prior to its release.

Referring again to FIGS. 2 and 3, in one embodiment, steam coils 182 are incorporated into the side walls 158, 160 and bottom portion 164 of the tank 110 The steam coils 182 include a steam inlet 184 for receiving steam from the boiler 102. Steam is returned to the boiler 102 through a steam outlet 186 from the steam coils 182. The steam coils 182 direct steam along the sides and bottom of tank 110. The circulation of steam through the side walls 158, 160 and bottom portion 164 of the tank 110 provide heat to the separated sludge fluid as well as solids along the tank floor 172. In one embodiment, a single steam coil 182 is incorporated into the side walls 158, 160 and bottom portion 164 of the tank 110.

In one embodiment, steam coils 182 are constructed immediately adjacent to the outer surface of the side walls 158 and 160 and bottom portion 164. In one embodiment, a single steam coil 182 is constructed immediately adjacent to the outer surface of the sidewalls 158 and 160 and bottom portion 164. The hood 178, shown in FIG. 3, insulates the tank 110 to reduce heat loss from the top of the tank 110. The heat keeps the fluid at a lower viscosity, which improves the settling of solids from the fluid. The heat also helps soften the solids, making them easier to convey.

Referring to FIG. 2, the tank 110 may include a plurality of vertically arranged valves 188 along one wall 158 and one of the inclined walls 166 in the bottom portion 164 of the tank 110. One or more of the valves 188 may be opened to direct the fluid to a separate treatment area or collection area (not shown). If demulsifiers have been used to help separate the oil component of the fluid from the water component of the fluid, valves 188 along or closer to the bottom portion 164 of the tank may be opened to remove the water component from the tank 110. Alternatively, valves 188 closer to the top of the tank 110 may be opened to remove the oil component from the tank 110. The valves 188 may be manually actuated or remotely actuated.

A plate 190 may be located within the tank 110 to separate the portion of the tank 110 in which the hydrocyclone separator 112 is located from the remainder of the tank 110. The plate 190 is may be placed at an angle within the tank 110 such that it is closer to one end wall 156 of the tank 110 at a top edge 192 and closer to the opposing end wall 154 of the tank 110 at a bottom edge 194 of the plate 190. The plate 190 is shaped to provide an opening between the bottom edge 194 and the tank floor 172 through which the means for conveying 174 directs the solids from the hydrocyclone separator 112. The plate 190 may be selectively located within the tank 110 to vary the volume of the portion of the tank in which the hydrocyclone 112 is located and the remaining portion of the tank.

Figure 4:
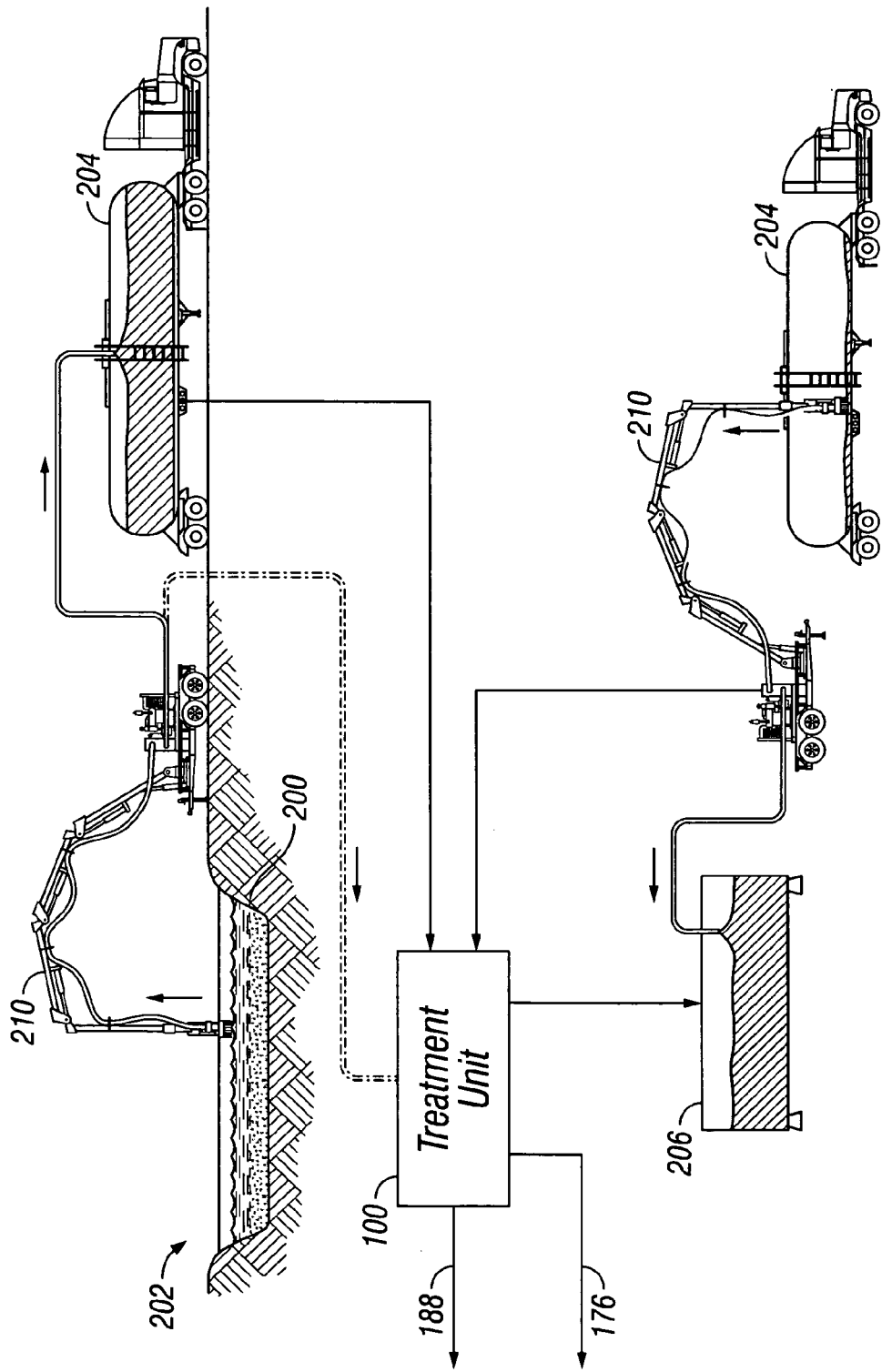
FIG. 4 is a diagram of a sludge treatment process.

Referring to FIG. 4, a process for treating oil-based sludge including the modular apparatus 100 is shown. Oil-based sludge 202 from a collection area 200 is transferred to the modular apparatus 100. The transfer from the collection area to the modular apparatus 100 may be made directly through use of a viscous fluid transfer apparatus 210. Alternatively, the transfer may be by utilizing a mobile discharge and feed system including a truck trailer 204. Sludge from the collection area 200 is transferred to the trailer 204. The truck then drives the sludge to a treatment area. The treatment area includes the modular apparatus 100, previously described. The treatment area may further include another treatment apparatus 206, such as a frac tank. In the modular apparatus 100, solids are removed and collected. The oil and water may be separated within the modular apparatus 100, as previously described and removed for further processing.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. An apparatus for treating oil-based sludge comprising:
   a boiler;
   a heat exchanger having a circulatory steam path in fluid communication with the boiler and a sludge path receiving sludge;
   a plurality of serially-aligned mixers in fluid communication with the sludge path of the heat exchanger, wherein each mixer receives the sludge;
   a separation tank in fluid communication with the plurality of mixers; and
   wherein the separation tank comprises:
      a tank having a plurality of walls;
      a hydrocyclone mounted entirely within the tank receiving sludge from the plurality of mixers;
      wherein the hydrocyclone includes a solids outlet directing a solids component towards a bottom portion of the tank and a fluid outlet directing a liquid component into the tank;
      a means for conveying separated solids along the bottom portion of the tank to a solids outlet; and
      a plurality of fluid outlets vertically located along a tank wall, wherein each outlet includes a valve providing selective fluid communication from the tank.

2. The apparatus of claim 1 further comprising:
   a first chemical tank including a demulsification chemical; and
   a first pump injecting a predetermined amount of demulsification chemical into the sludge.

3. The apparatus of claim 2 wherein at least one of the plurality of mixers is a static shear mixer providing sufficient shear to blend the sludge and the demulsification chemical.

4. The apparatus of claim 3, further comprising:
   a skid to which the heat exchanger, boiler, plurality of mixers, and the separation tank are all mounted.

5. The apparatus of claim 4, further comprising:
   a fuel tank mounted to the skid and providing fuel to the boiler; and
   a control panel mounted to the skid to control the pressure and temperature of steam entering the heat exchanger.

6. The apparatus of claim 5, further comprising:
   a first heat panel mounted to the skid separating the boiler from the heat exchanger; and
   a second heat panel mounted to the skid separating the boiler and the heat exchanger from the fuel tank and the control panel.

7. The apparatus of claim 1, further comprising:
   an insulative chamber enclosing the boiler.

8. The apparatus of claim 1 wherein the separation tank further comprises:
   a plate selectively located within the tank substantially isolating the hydrocyclone from remaining space within the tank.

9. An apparatus for treating oil-based sludge comprising:
   a boiler producing steam;
   a heat exchanger having a circulatory steam path in fluid communication with the boiler and a sludge path receiving sludge;
   a plurality of mixers in fluid communication with the sludge path of the heat exchanger, wherein the mixers are aligned in series and wherein each mixer receives the sludge;
   a separation tank in fluid communication with the mixers, including a plurality of walls defining a tank;
   a selectively closable hood mounted to an upper edge of at least one wall of the tank;
   a hydrocyclone retained entirely within a portion of the tank, wherein the hydrocyclone receives treated sludge from the mixers and removes a solid component from a fluid component in the sludge, directing the solids to a bottom portion of the tank and directing liquid to another portion of the tank;
   a plurality of fluid outlets each including a valve selectively communicating fluid from the tank;
   a solids outlet including a valve selectively communicating solids from the tank; and a means for conveying solids located along a bottom portion of the tank to the solids outlet.

10. The apparatus of claim 9, wherein the separation tank further comprises:
a plate selectively located within the tank to substantially separate the portion of the tank containing the hydrocyclone form the other portion of the tank.

11. The apparatus of claim 9, further comprising:
a heating tube arranged along opposing walls of the separation tank and in fluid communication with the boiler;
wherein the boiler provides steam to the heating tube to heat the walls of the separation tank.

12. The apparatus of claim 11, further comprising:
a pump providing selective doses of a demulsifying chemical to the sludge in the mixers; and
at least one container housing the demulsifying chemical in fluid communication with the pump.

13. The apparatus of claim 12, wherein the plurality of mixers comprises:
at least one static shear mixer inducing shear to the sludge and the demulsifying chemical mixture to provide additional blending of the sludge and the demulsifying chemical.

14. An apparatus for treating oil-based sludge comprising:
a boiler;
a heat exchanger having a circulatory steam path in fluid communication with the boiler and a sludge path receiving sludge;
a plurality of serially-aligned mixers in fluid communication with the sludge path of the heat exchanger, wherein each mixer receives the sludge;
a separation tank in fluid communication with the plurality of mixers; and
wherein the separation tank comprises:
a tank having a plurality of walls;
a hydrocyclone mounted entirely within the tank receiving sludge from the plurality of mixers;
wherein the hydrocyclone includes a solids outlet directing a solids component towards a bottom portion of the tank and a fluid outlet directing a liquid component into the tank;
a means for conveying separated solids along the bottom portion of the tank to a solids outlet; and
a plurality of fluid outlets vertically located along a tank wall, wherein each outlet includes a valve providing selective fluid communication from the tank.

15. The apparatus of claim 14 further comprising:
a first chemical tank including a demulsification chemical; and
a first pump injecting a predetermined amount of demulsification chemical into the sludge.

16. The apparatus of claim 15 wherein at least one of the plurality of mixers is a static shear mixer providing sufficient shear to blend the sludge and the demulsification chemical.

17. The apparatus of claim 16, further comprising:
a skid to which the heat exchanger, boiler, plurality of mixers, and the separation tank are all mounted.

18. The apparatus of claim 17, further comprising:
a fuel tank mounted to the skid and providing fuel to the boiler; and
a control panel mounted to the skid to control the pressure and temperature of steam entering the heat exchanger.

19. The apparatus of claim 18, further comprising:
a first heat panel mounted to the skid separating the boiler from the heat exchanger; and
a second heat panel mounted to the skid separating the boiler and the heat exchanger from the fuel tank and the control panel.

20. The apparatus of claim 14 wherein the separation tank further comprises:
a plate selectively located within the tank substantially isolating the hydrocyclone from remaining space within the tank.

* * * * *